UNITED STATES PATENT OFFICE.

ALFRED POLLAK, OF ALLACH, NEAR MUNICH, GERMANY.

METHOD OF INCREASING THE FERMENTATION PROPERTY OF YEAST.

1,061,494. Specification of Letters Patent. Patented May 13, 1913.

No Drawing. Application filed September 18, 1912. Serial No. 720,934.

*To all whom it may concern:*

Be it known that I, ALFRED POLLAK, a subject of the German Emperor, residing at Allach, near Munich, in the Kingdom of Bavaria, German Empire, have invented certain new and useful Improvements in Methods of Increasing the Fermentation Property of Yeast, of which the following is a specification.

My invention refers generally to yeast, and relates more specifically to a novel method whereby the fermentation property of yeast of any character is greatly augmented.

In the course of experiments for the purpose of obviating the harmful action of yeast autolysis during forced fermentation, the action of a group of bodies of which hexamethylenetetramin (urotropin, formin) is typical, was observed, the hexamethylenetetramin being used- because of its well known antiseptic quality. The result of these experiments was that, in addition to obtaining a strong conserving action, I also obtained an increase of over one hundred per centum in the fermentation property of the yeast. The increase in fermentation was further enhanced by the use of combinations of hexamethylenetetramin with phosphoric acid or phosphates, the latter substances being known as means for increasing the fermentation property of yeast. This treatment seems to result in rendering extremely active the latent or weakened enzym present in the yeast cell. Concurrent with this action there is also a protective action against deleterious influences of the surrounding media.

The invention may be carried out in several ways; for example, the yeast, prior to its principal fermentation, may be treated with the preparation in solution or suspension, or the preparation may be added to the fluid to be fermented.

Following are two concrete examples of the manner in which the invention may be practised:—

1. Treat 100 kg. of yeast for a short time with ½ kg. of the preparation held in solution or in suspension in 100 liters of water. After removal from the liquid, the yeast may be used for all kinds of fermentation known to the several technical arts, and may also be used for baking purposes, its keeping properties and action being much greater than those of the ordinary product. If the yeast is not to be used immediately after its treatment, it may remain suspended in the liquid for any length of time, without deterioration.

2. To 100 liters of mash prepared in any desired manner and of any suitable composition, are added about 250 gr. of the preparation and the mixture is permitted to ferment. The effect of the preparation is made apparent by a clean and accelerated fermentation, and a stronger final fermentation.

I claim:—

1. The herein described method of increasing the fermentation property of yeast, which consists in subjecting yeast to treatment with hexamethylenetetramin.

2. The herein described method of increasing the fermentation property of yeast, which consists in adding a solution of hexamethylenetetramin to the fluid to be fermented.

3. The herein described method of increasing the fermentation property of yeast, which consists in subjecting yeast to treatment with a preparation of hexamethylenetetramin and phosphoric acid.

4. The herein described method of increasing the fermentation property of yeast, which consists in subjecting yeast to treatment with a preparation of hexamethylenetetramin and a phosphate.

In testimony whereof I have affixed my signature in presence of two witnesses.

ALFRED POLLAK.

Witnesses:
J. STOTZE,
A. V. W. COTTER.